United States Patent [19]

Logan et al.

[11] 4,167,734

[45] Sep. 11, 1979

[54] SHAFT SPEED AND HOT BEARING INDICATING APPARATUS

[75] Inventors: James D. Logan, Pullman; Guy J. Swanson, Spokane, both of Wash.

[73] Assignee: Watchdog, Inc., Spokane, Wash.

[21] Appl. No.: 767,290

[22] Filed: Feb. 10, 1977

[51] Int. Cl.² .................. G01D 21/00; G08B 19/00
[52] U.S. Cl. .................. 340/682; 308/1 A; 324/168; 340/590
[58] Field of Search .............. 340/227.1, 231, 228 R, 340/269, 271, 57, 584, 590, 682; 324/161, 168; 308/1 A; 116/74, 114 Q, 115

[56] References Cited

U.S. PATENT DOCUMENTS

| | | | |
|---|---|---|---|
| 2,963,691 | 12/1960 | Yerger | 340/231 |
| 2,976,523 | 3/1961 | Duffy | 340/231 |
| 3,264,560 | 8/1966 | Cheney | 340/271 |
| 3,559,205 | 1/1971 | Colby | 340/279 |
| 3,611,343 | 10/1971 | Schoenbach | 340/271 |
| 3,678,474 | 7/1972 | Brown | 340/173 R |
| 3,853,087 | 12/1974 | Aldag | 116/114 R |
| 3,916,361 | 10/1975 | Hasegawa et al. | 335/207 |

Primary Examiner—John W. Caldwell, Sr.
Assistant Examiner—Joseph E. Nowicki
Attorney, Agent, or Firm—Wells, St. John & Roberts

[57] ABSTRACT

A shaft speed and hot bearing indicating apparatus is described having a transducer actuating means mounted on the shaft immediately adjacent the supporting bearing for actuating an electrical transducer to produce an electrical pulse as the transducer actuating means is rotated during each revolution of the shaft. The transducer pulse is processed by an electronic mechanism for multiplying the transducer pulse by sixty by a phase-locked loop network and then counting the number of multiplied pulses occurring during each one second of time interval in a BCD counting mechanism. The total count is displayed each second on a decimal digital display. The apparatus also has means for activating an alarm when the sensed speed falls below a preset speed. The transducer activating means is responsive to the temperature of the bearing and is rendered ineffective when a preset temperature is reached.

10 Claims, 4 Drawing Figures

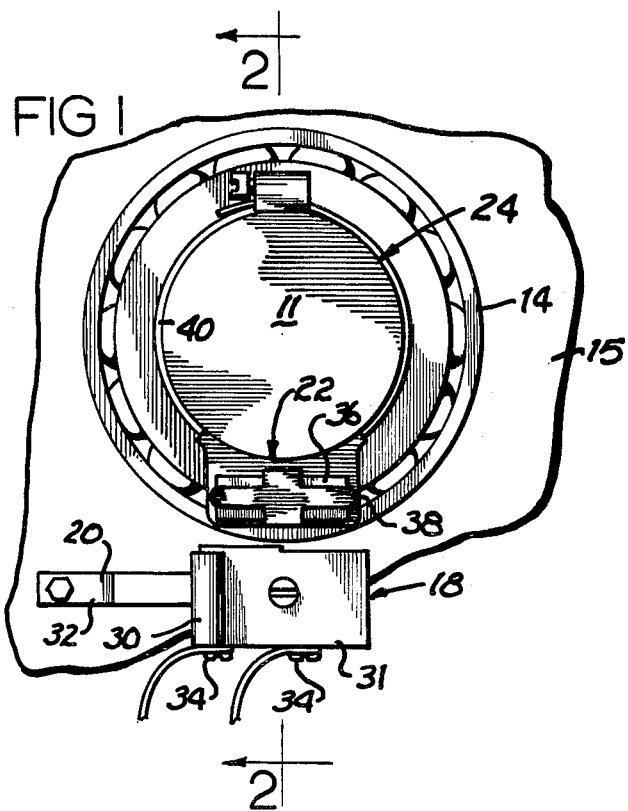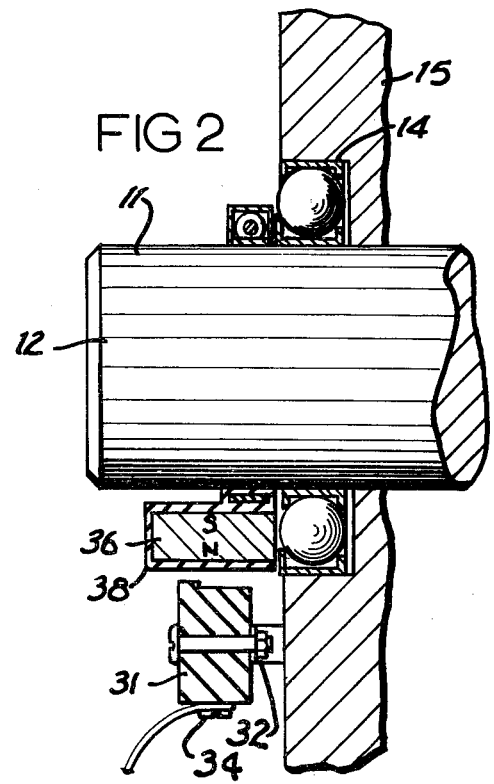

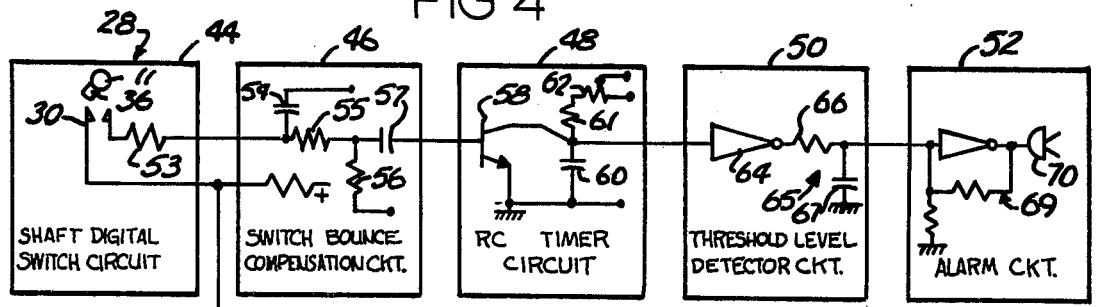
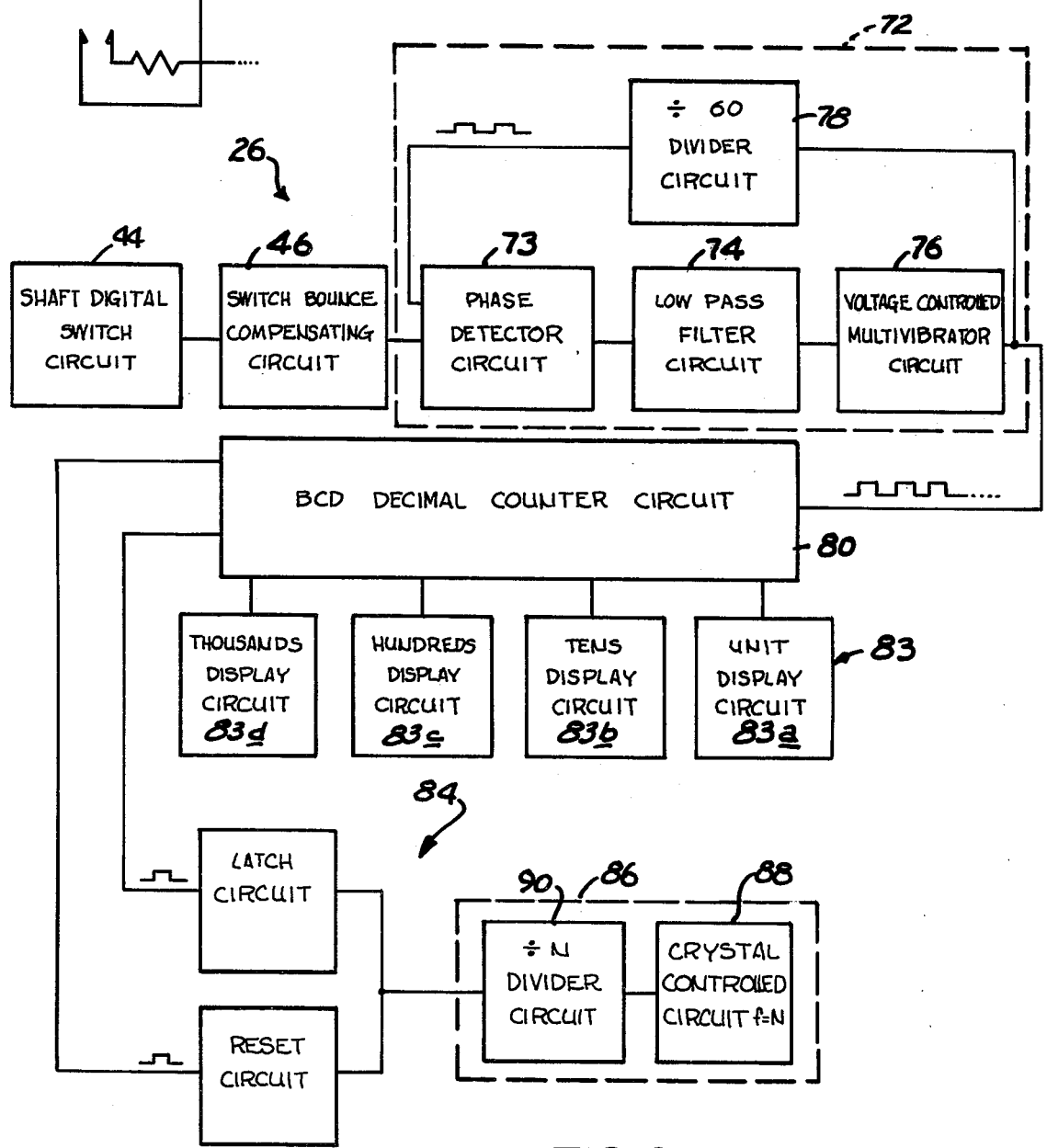
FIG 3

SHAFT SPEED AND HOT BEARING INDICATING APPARATUS

BACKGROUND OF THE INVENTION

This invention relates to apparatus for monitoring the speed of shafts and for indicating whether or not shaft support bearings are overheated.

One of the principal objects of this invention is to provide a digital, "real time" shaft indicating device that is accurate within one RPM.

An additional object of this invention is to provide a shaft speed indicating device that has a capability of determining when the bearing supporting the shaft has overheated and providing an inexpensive means for activating an alarm circuit.

A further object of this invention is to provide a very accurate "real time" digital shaft speed indicating device that is quite reliable and can be utilized on a wide variety of shafts under a wide variety of conditions.

An additional object of this invention is to provide a shaft speed indicating device that may be easily installed and have a life far exceeding 500 million revolutions with an accuracy of within one RPM.

A further object of this invention is to provide a shaft speed indicating device that is not adversely affected by substantial shaft deflection and axial shaft movement.

These and other objects and advantages of this invention will become apparent upon reading the following detailed description of a preferred embodiment.

BRIEF DESCRIPTION OF THE DRAWINGS

The enclosed drawings illustrate a preferred embodiment, in which:

FIG. 1 is an end view of a bearing and shaft assembly illustrating an electrical transducer and transducer actuating means mounted with respect to a shaft and bearing assembly;

FIG. 2 is a vertical cross-sectional view taken along line 2—2 in FIG. 1 further illustrating the relationship of the electrical transducer and transducer actuating means with respect to the shaft and bearing assembly;

FIG. 3 is an electrical schematic view illustrating an electronic circuit for activating an alarm when the bearing overheats; and FIG. 4 is an electrical schematic view illustrating an electronic circuit for providing a decimal readout of the rotational speed of the shaft.

DETAILED DESCRIPTION OF A PREFERRED EMBODIMENT

Referring now in detail to the drawings, there is illustrated in the accompanying drawings a shaft speed and hot bearing indicating apparatus. The apparatus is designed to provide a "real time" decimal readout of the rotational speed of shaft 11 (FIGS. 1 and 2) as it rotates about its axis. The shaft 11 is supported at one end by a bearing 14 having a bearing housing 15. The apparatus is additionally designed to indicate a failure of the bearing 14 preventing or seriously restricting rotation of the shaft 11. Particularly such failures are synonymous with the bearing overheating or freezing causing the shaft to reduce its rotation or stop.

The apparatus includes a transducer 18 that is positioned with respect to the shaft for generating an electrical signal in the form of a digital pulse during each revolution of the shaft 11 about the shaft axis. The transducer 18 is positioned adjacent the shaft end 12 by a transducer mounting means 20.

The transducer 18 is activated to generate the electrical transducer signal by a transducer actuating means 22 that is affixable to the shaft 11 for rotation with the shaft. The transducer actuating means 22 is designed to rotate in a normal annular path about the shaft axis for actuating the transducer at least once during each revolution. The transducer mounting means 20 positions the transducer 18 with respect to the annular path of the transducer actuating means 22 so that the transducer 18 is actuated during each revolution of the transducer actuating means. The transducer actuating means 22 has a support means 24 for releasably securing the transducer actuating means 22 firmly to the shaft end 12. The supporting means 24 is temperature sensitive so that should the bearing 14 become overheated, the heat from the bearing will affect the support means 24 in such a manner as to cause the support means 24 to deflect the transducer actuating means 22 from the annular path and thereby prevent the transducer actuating means 22 from activating the transducer 18. Consequently should the bearing fail from overheating, the electrical signals normally transmitted by the transducer 18 would be discontinued.

The apparatus further includes an electronic means 26 (FIG. 4) that is responsive to the digital pulses generated by the transducer 18 for providing a real time decimal readout of the rotational speed of the shaft 11 about its axis. In a preferred embodiment, the digital means 26 displays a reading in revolutions per minute (RPM) with the display being updated each one second time interval to obtain a substantially "real time" decimal display of the revolutionary speed of the shaft.

The apparatus further includes a second electronic means 28 (FIG. 3) that is responsive to the digital pulse generated by the transducer 18 for activating an alarm signal should the shaft rotational speed drop below a preset value or diminish altogether.

More specifically the transducer 18, in a preferred embodiment, includes a magnetically operable sealed reed switch 30 having a switch axis that is substantially radial to the shaft axis 11. The transducer 18 includes a housing 31 for encapsulating the reed switch 30. The transducer mounting means 20 includes a bracket 32 for supporting the reed switch 30 with the axis of the reed switch substantially radial to the shaft axis and placing the reed switch adjacent the annular path of the transducer actuating means 22. In many applications the bracket 32 is mounted on the bearing housing 15 with the reed switch 30 being positioned stationary with respect to the rotation of the shaft 11. The transducer 18 includes terminals 34. One terminal is connected to a transducer common wire and the second terminal is electrically connected to electronic means 26 and 28.

The transducer actuating means 22 in the preferred form includes a permanent bar magnet 36 that is mounted in an encapsulating housing 38 and supported on the shaft end 12 for rotation with the shaft. The permanent magnet is preferably a ceramic magnet having a broad girth with its minor dimension extending between the north and south poles. With the broad girth the magnet 36 is able to actuate the switch 20 even though the shaft may be shifted axially up to a distance of one inch.

The housing 38 supports the permanent magnet 36 for rotation in the desired annular path to actuate the transducer 18 only once during each revolution of the shaft 11. The permanent bar magnet 36 is supported by the housing 38 so that the magnetic axis between the north and south pole of the magnet 36 extends substantially radial to the axis of the shaft 11. It is very important that the axis of the permanent magnet 36 be axially aligned with the axis of reed switch 20 as the permanent magnet 36 passes by the reed switch 20 so that only one electrical signal is generated during each revolution of the shaft. Such a feature prevents double or multiple actuation of the reed switch which frequently occurs if the reed switch is perpendicular to the magnetic axis. Such a feature significantly extends the life of the reed switch 20.

The housing 38 is supported on the shaft 11 through a shaft strap or hose clamp 40 that is adjustable to various diameter sizes of shafts 11. The housing 38 is constructed at least in part with a thermoplastic resin having a melting or softening point between 190° F. and 260° F. so that should the bearing 14 become overheated it will cause the housing 38 to melt or soften rendering the permanent magnet 36 unsupported with the permanent magnet being displaced by centrifugal force from the normal annular path. In a preferred form, the housing 38 is constructed of a thermoplastic resin having a melting or softening point between 230° F. and 260° F. Such a system provides for a very economical, yet reliable way of determining when the bearing 14 has overheated and thereby prevent further equipment damage. The transducer actuating means 22 is rather inexpensive to manufacture enabling a person to easily replace the transducer actuating means 22 at the same time that a new bearing 14 is installed.

The alarm electronic means 28, illustrated in schematic form in FIG. 3, includes a shaft digital switch circuit 44 that includes the electrical contacts of the reed switch 30. Additionally the alarm electronic means 28 includes a switch bounce compensating circuit 46 to prevent signal error caused by bounce of the reed switch contacts. Frequently during closure of the reed switch the mechanical impact between the contacts takes place followed by a rebound which causes momentary loss of contact for 0.1 ms to 10 ms. The switch may rebound again and again during the first 10–50 ms following the first closure of the switch. The switch bounce compensating circuit 46 is designed to eliminate any false signal generating because of such switch bouncing.

The alarm electronic means 28 further includes an RC timing circuit 48 that receives the digital signal from the transducer 18 and processes the signal to a threshold level detection circuit 50. The RC circuit 48 is adjustable so that if a signal is not received during a preset time interval then the threshold level detection circuit 50 is energized to activate an alarm circuit 52.

Various types of electronic configurations may be utilized to accomplish this purpose and one such preferred embodiment is illustrated schematically in FIG. 3. Specifically the shaft digital switch circuit 44 includes a resistor 53 that is mounted in series with the contacts of the reed switch 30 to reduce contact wear and eliminate danger from momentary inadvertent short circuit to ground.

The switch bounce compensating circuit 46 preferably includes a charging and discharging capacitor 54 that is mounted in series with charging resistors 55 and 56 between the line voltage. When the reed switch 30 is open the line voltage charges the capacitor 54 to full line voltage through the resistors 55 and 56 according to the time constant defined by the values of the capacitor 54 and resistors 55 and 56. The time constant is preferably greater than 55 ms so that the switch bounce compensating circuit 46 will compensate for any momentary switch openings and closings caused by the bounce effect. When the reed switch contacts are closed the capacitor 54 is rapidly discharged through the resistor 53 to ground. Such discharge of capacitor 54 generates a strong pulse that is passed through a capacitor 57 to the RC timing circuit 48. The strong pulse from the capacitor 54 is directed to momentarily turn on a transistor 58 which is part of the RC timing circuit 48. When the transistor 58 is turned on, it rapidly discharges a timing capacitor 60. The timing capacitor 60 is mounted in series with a fixed resistor 61 and a variable adjustable resistor 62. Consequently the time constant of the RC circuit 48 may be adjusted by changing the value of the variable resistor 62. The transistor 58 when energized rapidly discharges the capacitor 60. When the transistor 58 is turned off the line voltage recharges the capacitor 60 in relation to the adjusted recharging time constant of the circuit.

The circuit 50 includes an inverter 64 having a high and low state. The inverter 64 serves as a threshold detector and changes from one state to the other state as capacitor 60 is rapidly discharged from full line voltage. Preferably, the inverter 64 changes state when the impressed voltage is approximately 0.45 of the total line voltage. The inverter 64 produces a square wave output pulse. The threshold level detection circuit 50 further includes an averaging subcircuit 65 that includes a series resistor 66 and a capacitor 67.

The square wave pulse from the inverter 64 is passed through a Schmidt trigger circuit 69 which is part of the alarm circuit 52 to activate an alarm device 70. The alarm device 70 may be in the form of an audible device or a visual device or both. The Schmidt trigger circuit 69 is included to provide for a very sharp actuation of the alarm device.

The RC timing circuit 48 may be adjusted to set the alarm 70 at a particular revolutionary speed of the shaft 11. For example it may be desirable to cause the alarm system to be activated when the shaft rotates at a speed less than 60 RPM. In such a case the variable resistor 62 is set so that the capacitor 60 is recharged to 0.45 of total line voltage during approximately half of each one second interval between pulses. Consequently if the interval between pulses is greater than one second then the capacitor 60 will be charged above 0.45 of line voltage earlier in the cycle, causing the inverter 64 to change states earlier, thereby increasing the average voltage in the averaging subcircuit 65 and triggering the alarm device 70. As long as the timing interval between the digital signals from the transducer 18 is less than the one second then the capacitor 60 remains charged below the 0.45 of line voltage for greater than 50% of the time and the averaged voltage remains below the alarm threshold.

Should the bearing 14 become overheated causing the shaft to stop or slow down below the alarm threshold then the alarm device 70 will automatically be triggered as soon as the revolutionary speed falls below the preset value.

Additionally it should be noted that should the shaft stop the alarm device 70 will be actuated regardless of whether the switch 30 is closed or open since capacitor 60 will be recharged to above 0.45 of line voltage unless the transistor 58 receives a second pulse within the preset timing interval.

The electronic means 26 is illustrated in FIG. 4 for digitally counting and providing a decimal display of the revolutionary speed of the shaft 11 on a substantially "real time" basis. The electronic configuration illustrated in FIG. 4 is a preferred arrangement and includes the switch bounce compensating circuit 46 for preventing error due to noise arising from switch bounce.

The digital pulse from the switch bounce compensating circuit 46 is processed by a phase-locked loop network 72 in which the phase of the digital signal is compared against an automatically adjustable reference pulse.

The phase-locked loop network 72 includes a phase detection circuit 73 which compares the phase of the source signal with the reference signal to determine if the two signals are in phase or whether one pulse lags or leads the other. If the two pulses are in phase, the phase detection circuit generates a preselected voltage signal. The signal from the phase detection circuit 73 is processed by a low pass filter circuit 74 for averaging the output of the phase detection circuit 73. The voltage signal is then transferred to a voltage controlled multivibrator circuit 76 which generates a train of pulses having a frequency in linear proportion to the applied voltage.

In a preferred embodiment in which the system is designed to indicate the shaft speed in revolutions per minute (RPM), the multivibrator circuit 76 is intended to generate 60 pulses for each incoming shaft rotation pulse when the preselected reference voltage is applied (source pulse and reference pulse are in phase). When the frequency match occurs, the circuit is said to be "locked in." The acquisition time period of the phase-locked loop network 72 is determined by characteristics of the low pass filter circuit and the incoming signal frequency.

The phase locked-loop circuit 72 includes a negative feedback segment which includes a ÷60 divider circuit 78 which generates the reference pulse. The reference pulse is then fed back to the phase detection circuit 73. By such a system a reference pulse rapidly assumes the same phase as the source pulse so that the phase-locked loop circuit 72 is in effect serving as a very accurate dynamic multiplying circuit. The ÷60 divider circuit 78 divides the number of pulses from the multivibrator circuit to define the reference pulse as applied to the phase detection circuit 73. Consequently when the source pulse and the reference pulse are in phase, the multivibrator circuit 76 will generate exactly 60 pulses per input pulse, effectively multiplying the input frequency by exactly 60.

As an example of the operation of phase-locked loop circuit 72 it will be assumed that the shaft is rotating at 1200 revolutions per minute. Consequently 20 source pulses are generated each second. For each source pulse received by the pulse detection circuit 73, 60 pulses are generated by the multivibrator circuit 76. Consequently when the phase detection circuit 73 receives the 20 source pulses per second then the output of the multivibrator circuit 76 generates 1200 pulses per second. As the shaft speed increases or decreases the phase-locked loop network 72 rapidly tracks the change and responds within the one second readout period. The phase-locked loop network 72 is able to multiply the incoming pulse with no loss of accuracy in a dynamic environment.

The output pulses from the phase-locked loop circuit 72 are received by a BCD digital counter circuit 80. The counter circuit 80 counts the received pulses from the phase-locked loop circuit 72 and transfers the signals to a decimal display system 83 having multiple decimal display sections 83a, 83b, 83c, and 83d for displaying the rotational speed of the shaft in digital (decimal) terms. The counter circuit 80 is controlled by control clock means circuit 84. The control clock means 84 activates the counter circuit 80 to count the number of pulses from the phase-locked loop circuit 72 during a preset time interval. In a preferred embodiment, the control clock means 84 includes a one second clock circuit 86 that accurately generates a signal during each second. In a preferred embodiment the one second clock 86 includes a crystal circuit 88 for generating a rather high frequency reference signal. The high frequency reference signal of "N" cycles per second is presented to a ÷ "N" divider circuit 90 which divides the frequency to a very accurate one hz output pulse. In one embodiment, the crystal 88 is designed to generate 32.768 khz with the ÷ "N" divider circuit 90 then dividing the frequency by 32.768 (which is $2^{15}$) with an output of 1 hz pulse. The ÷ "N" circuit 90 is connected to a latch circuit 92 and to a reset curcuit 94 so as to read out the count from circuit 80 to the digital display circuit 83 during each second and to reset the counter circuit 80 to receive subsequent train of pulses during each subsequent one second interval. Consequently in the example given, the counter circuit 80 would receive 1200 pulses during each second with the digital numeral 1200 being displayed by the decimal display unit 83. The reset circuit 94 would then reset the counter circuit 80 to receive the subsequent number of pulses during the succeeding second. Consequently the display on the decimal display circuit sections 83a–d will be updated every second to provide a substantially "real time" display utilizing digital signal pulses from the transducer 18.

If the apparatus is utilized on a vehicle, it may be desirable to display the shaft speed in terms of vehicle speed rather than RPM. This can be easily accommodated by adjusting the multiplier (N) of the phase-locked loop circuit and the time interval (T) of the clock circuit. The relationship may be depicted by the formula: Display Number $=f \cdot N \cdot T$ in which f is the shaft pulse rate. N and T may be selected to "read out" the desired units, such as miles per hour, with a sufficiently rapid rate that the display is substantially "real time."

It should be understood that the above described embodiment is simply illustrative of the principals of this invention and numerous other embodiments may be readily devised without deviating therefrom.

What I claim is:

1. A shaft speed and hot bearing indicating apparatus for determining the speed of a shaft supported by a bearing and determining overheating of the bearing, comprising:
   a transducer actuating means;
   means for normally supporting the transducer actuating means on the shaft immediately adjacent the supporting bearing for rotation with the shaft in a prescribed normal annular path;
   an electrical transducer for generating electrical pulses when actuated by the transducer actuating means;
   means for mounting the electrical transducer with respect to the annular path of the transducer actuating means so that the electrical transducer is actuated during each revolution of the shaft to generate one electrical pulse;

said means for supporting the transducer actuating means being responsive to the temperature of the bearing for displacing the transducer actuating means from the annular path when the bearing is overheated to prevent the transducer actuating means from actuating the electrical transducer when the bearing is overheated;

a first electronic means operatively connected to the electrical transducer for receiving the generated electrical pulses and electronically computing and visually displaying the speed of the shaft in response to the number of pulses received in a prescribed time period; and a second electronic means operatively connected to the electrical transducer for electronically determining the absence of generated electrical pulses for a prescribed period of time and in response thereto activating an alarm device.

2. The indicating apparatus as defined in claim 1 wherein the transducer actuating means includes a permanent magnet and wherein the electrical transducer includes a magnetically operable electrical switch.

3. The indicating apparatus as defined in claim 1 wherein the means for normally supporting the transducer actuating means on the shaft includes a housing constructed of a thermoplastic resin having a melting point between 190° F. and 260° F. that is adapted to soften when the bearing is overheated, causing the transducer actuating means to be displaced from the normal annular path.

4. The indicating apparatus as defined in claim 2 wherein the permanent magnet has a magnetic axis extending between its north and south poles and where the magnetically operable electrical switch includes a reed switch having a switch axis that is axially aligned with the magnetic axis of the permanent magnet when the switch and magnet are opposed to each other.

5. The indicating apparatus as defined in claim 3 wherein the means for supporting the transducer actuating means include a hose clamp adapted to be releasably secured circumferentially about the shaft immediately adjacent the bearing and wherein the thermoplastic resin support housing is molded to the hose clamp and about the transducer actuating means to normally secure the transducer actuating means to the hose clamp.

6. A hot bearing indicating apparatus for determining overheating of a bearing rotatably supporting a shaft, comprising:

a transducer actuating means;

means for normally supporting the transducer actuating means on the shaft immediately adjacent the supporting bearing for rotation with the shaft in a prescribed normal annular path;

an electrical transducer for generating an electrical pulse when actuated by the transducer actuating means;

means for mounting the electrical transducer with respect to the annular path of the transducer actuating means so that the electrical transducer is actuated during each revolution of the shaft to generate only one electrical pulse;

said means for normally supporting the transducer actuating means being responsive to the temperature of the bearing for displacing the transducer actuating means from the annular path when the bearing is overheated to prevent the transducer actuating means from activating the electrical transducer and thereby prevent the generation of electrical pulses when the bearing is overheated; and an electronic means operatively connected to the electrical transducer for electrically determining the absence of generated electrical pulses for a preselected period of time and in response to such electronic determination activating an alarm device.

7. The hot bearing indicating apparatus as defined in claim 6 wherein the means for normally supporting the transducer actuating means on the shaft includes a supporting housing constructed of a thermoplastic resin having a melting point between 190° F. and 260° F. that is adapted to soften when the bearing is overheated causing the transducer actuating means to be displaced from the normal annular path.

8. The hot bearing indicating apparatus as defined in claim 7 wherein the means for supporting transducer actuating means includes a hose clamp adapted to be releasably secured circumferentially about the shaft immediately adjacent the bearing and wherein the thermoplastic resin supporting housing is molded to the hose clamp and about the transducer actuating means to normally secure the transducer actuating means to the hose clamp.

9. The indicating apparatus as defined in claim 6 wherein the electrical transducer includes a physical contact switch that bounces when activated and wherein the electronic means includes a switch bounce compensating circuit for preventing the generation of error electrical pulses when the contact switch bounces.

10. The indicating apparatus as defined in claim 7 wherein the electronic means includes:

an RC timing circuit that generates a signal having a voltage above a threshold voltage value when the time period between successive pulses received from the electrical transducer exceeds a preselected period; and a threshold voltage level detection circuit responsive to the signal for activating the alarm device when the voltage of the signal exceeds the threshold voltage.

* * * * *